(12) United States Patent
Gyorfi et al.

(10) Patent No.: US 7,696,992 B2
(45) Date of Patent: Apr. 13, 2010

(54) METHOD AND APPARATUS TO FACILITATE MULTI-SETTING VIRTUAL REALITY EXPERIENCES

(75) Inventors: Julius S. Gyorfi, Vernon Hills, IL (US); Eric R. Buhrke, Clarendon Hills, IL (US); Juan M. Lopez, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 644 days.

(21) Appl. No.: 11/623,652

(22) Filed: Jan. 16, 2007

(65) Prior Publication Data

US 2008/0170065 A1 Jul. 17, 2008

(51) Int. Cl.
*G06T 15/00* (2006.01)

(52) U.S. Cl. .................. 345/419; 370/260; 370/352; 348/14.08

(58) Field of Classification Search .......... 345/419; 370/260, 352; 348/14.08
See application file for complete search history.

(56) References Cited

U.S. PATENT DOCUMENTS

| | | | |
|---|---|---|---|
| 5,956,038 A | 9/1999 | Rekimoto | |
| 6,570,563 B1 | 5/2003 | Honda | |
| 6,767,287 B1 | 7/2004 | Mcquaid et al. | |
| 7,362,349 B2 * | 4/2008 | Nelson et al. | 348/14.08 |
| 7,411,939 B1 * | 8/2008 | Lamb et al. | 370/352 |
| 7,417,959 B2 * | 8/2008 | Dorner et al. | 370/260 |
| 7,567,554 B2 * | 7/2009 | Brown et al. | 370/352 |
| 2004/0135820 A1 | 7/2004 | Deaton et al. | |
| 2004/0143852 A1 | 7/2004 | Meyers | |
| 2005/0043097 A1 | 2/2005 | March et al. | |

FOREIGN PATENT DOCUMENTS

| | | |
|---|---|---|
| WO | WO9942917 A2 | 8/1999 |
| WO | WO9942918 A2 | 8/1999 |
| WO | WO0242921 A1 | 5/2002 |
| WO | WO2005020129 A2 | 3/2005 |

OTHER PUBLICATIONS

Caltagirone et al., "Architecture for a Massively Multiplayer Online Role Playing Game Engine," J. of Comp. Sciences in Colleges, v. 18, No. 2, pp. 105-116, 2002.
Athina Nickitas-Etienne, PCT/US2007/088939—PCT International Preliminary Report on Patentability, The International Bureau of WIPO, Geneva, Switzerland, Jul. 30, 2009.
Di Verdi, et al., "A Framework for Generic Inter-Application Interaction for 3D AR Environments," IEEE International Augmented Reality Toolkit Workshop, 2003, Oct. 7, 2003, pp. 86-93.
Jorissen, et al., "Dynamic Interactions in Physically Realistic Collaborative Virtual Environments," IEEE Transactions on Visualization and Computer Graphics, vol. 11, No. 6, Nov./Dec. 2005, 649-660.

* cited by examiner

*Primary Examiner*—Phu K Nguyen

(57) ABSTRACT

When providing (101) a user a first interactive virtual reality experience via a first virtual setting and upon detecting (102) a need to transition the user to a second interactive virtual reality experience via a second virtual setting (that is different from the first virtual setting), one maintains (103) a reduced presence of the user in the first virtual setting and establishes (104) a full presence of the user in the second virtual setting. By one approach, these virtual settings can comprise, for example, virtual rooms such as, but not limited to, virtual incident command centers to facilitate the handling of public safety services of various kinds and types.

18 Claims, 2 Drawing Sheets

METHOD AND APPARATUS TO FACILITATE MULTI-SETTING VIRTUAL REALITY EXPERIENCES

TECHNICAL FIELD

This invention relates generally to interactive virtual reality experiences and more particularly to the management of virtual settings within which such experiences occur.

BACKGROUND

Interactive virtual reality experiences are known in the art. Such experiences often make use of a multi-media presentation to present a context, such as a room or the like, within which the user can interact with animate and/or inanimate objects and/or other participants. Such experiences are often employed to facilitate an entertainment activity or to facilitate conferencing, event management, or the like.

In some cases, a participant in such an experience may find it useful or even necessary to participate in multiple such experiences in a quasi-parallel or rapidly successive manner. During a significant civic emergency, for example, a high ranking authority figure such as a mayor may wish or need to participate in various public safety interactive virtual reality experiences (as correspond, for example, to a police conference room, a fire fighters conference room, and so forth).

Prior art solutions provide techniques for moving from one such virtual setting to another in order to facilitate such successive participation by such an individual. In general, however, such solutions tend to either fully integrate the entire scope of the experience (and hence can consume large quantities of network bandwidth as well as remote and local computational capacity) or to treat such successive experiences in a discrete and fully independent manner (and hence can lead to undesired interruptions, delays, and reduced fluidity as the user moves from setting to setting).

BRIEF DESCRIPTION OF THE DRAWINGS

The above needs are at least partially met through provision of the method and apparatus to facilitate multi-setting virtual reality experiences described in the following detailed description, particularly when studied in conjunction with the drawings, wherein.

Figure 1:
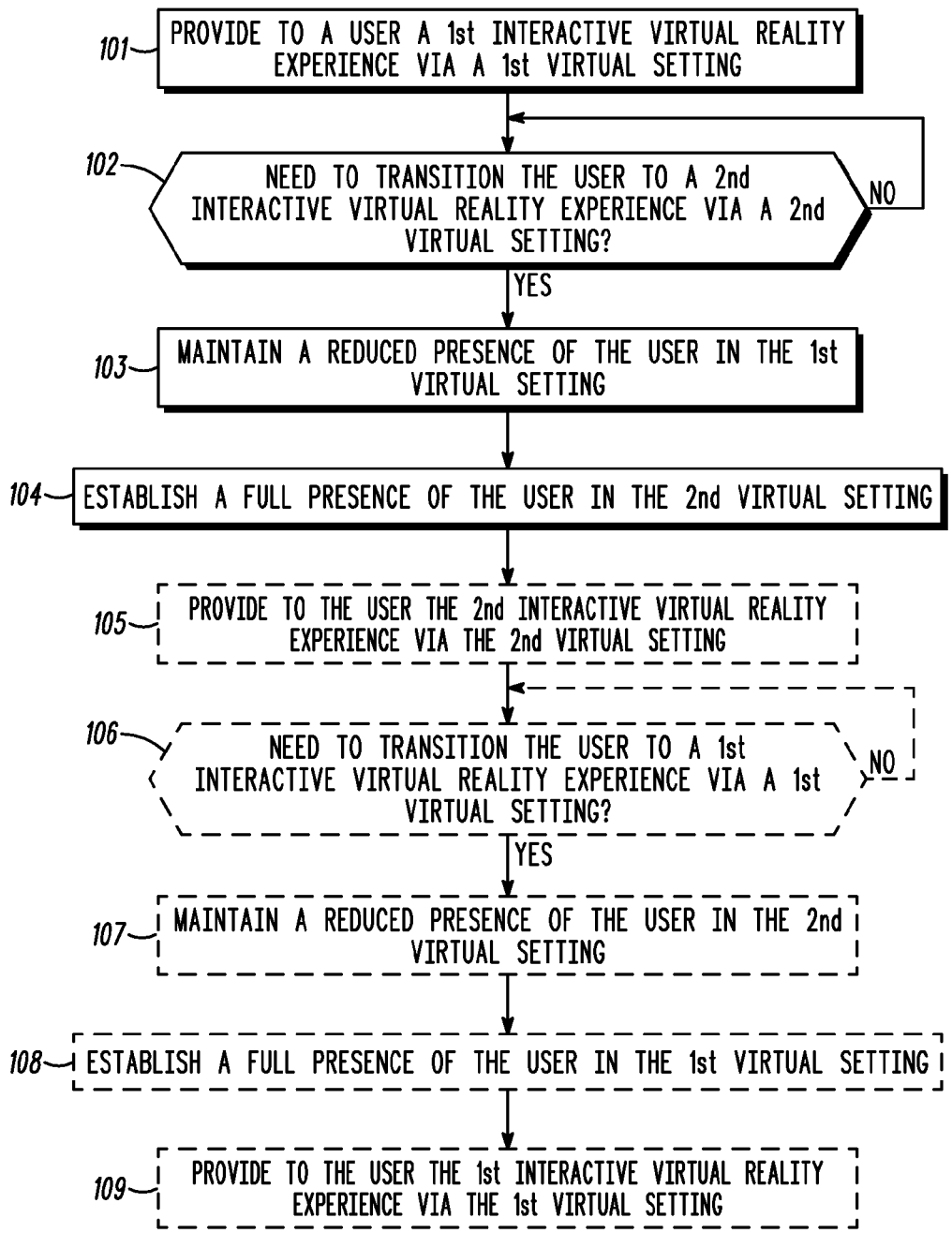
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, when providing a user a first interactive virtual reality experience via a first virtual setting and upon detecting a need to transition the user to a second interactive virtual reality experience via a second virtual setting (that is different from the first virtual setting), one maintains a reduced presence of the user in the first virtual setting and establishes a full presence of the user in the second virtual setting. By one approach, these virtual settings can comprise, for example, virtual rooms such as, but not limited to, virtual incident command centers to facilitate the handling of public safety services of various kinds and types.

By one approach, this reduced presence can comprise, for example, marking an avatar as corresponds to the user in the first virtual setting with an indicator to indicate the reduced presence state of the user in that first virtual setting. This can also comprise, in addition to or in lieu thereof, suspending at least some processes (such as streaming content processes) as pertain to providing the user the first interactive virtual reality experience via the first virtual setting. Similarly, establishing a full presence in the second virtual setting can comprise, at least in part, facilitating at least some such processes within that second virtual setting.

Such teachings are also readily applicable to similarly transition such a user from the second virtual setting back to the first virtual setting. In such a case, the presence of the user in the second virtual setting can be similarly reduced and the full presence of the user in the first virtual setting established as before.

Those skilled in the art will recognize and appreciate that these teachings provide a relatively simple and cost effective approach to facilitating such setting-to-setting shifts in a manner that both readily supports such activity while remaining relatively respectful of resource usage (including content-bearing bandwidth as well as local and remote computational requirements). These teachings are easily leveraged to accommodate a variety of application settings and will also readily scale to meet the needs and/or opportunities posed by various contexts.

These and other benefits may become clearer upon making a thorough review and study of the following detailed description. Referring now to the drawings, and in particular to FIG. 1, an exemplary illustrative process 100 provides 101 a first interactive virtual reality experience via a first virtual setting to a given user. This interactive virtual reality experience can comprise any of a wide variety of experiences as are presently known or as may be developed going forward.

By one approach this experience can comprise an experience that provides substantially real-time interaction with at least one other user. This can comprise, for example, a collaborative environment where persons having a shared interest can share data, confer, propose ideas, and, in general, manage a corresponding process of interest. So configured, for example, users collaborating in the virtual reality experience may be able to share access to one or more informational inputs.

The virtual setting itself can also comprise any of a wide variety of form factors and/or constructs as desired. By one approach, this virtual setting can comprise a virtual room (such as, but not limited to, a conference room or a command center) having tools and the like to facilitate the sharing of information. Such tools can comprise, but are not limited to, virtual display screens, user manipulable controls, and so forth.

Also, if desired, this interactive virtual reality experience can include the use of avatars that represent (in as realistic or fanciful a manner as desired) the various users who are interacting within the virtual setting with one another. Such avatars can serve to assist with interacting with other elements of the virtual setting and/or to facilitate an understanding of which user is offering which inputs.

In a not untypical scenario, this step of providing a first interactive virtual reality experience may comprise using one or more application servers that assemble and provide (often using streaming technologies of choice) the corresponding renderable content to the users via a client application (or applications). In general, the elements of providing such an experience are well known in the art and require no further elaboration here.

This process 100 then provides for detecting 102 a need to transition the user from the first interactive virtual reality experience to a second interactive virtual reality experience via a second virtual setting. In a typical application scenario this second virtual setting will be different from the first virtual setting. To provide a practical illustration in this regard (and without intending any suggestion of limitation or exhaustion in this regard), the user might comprise the mayor of a town with the first virtual setting comprising a police services command center and the second virtual setting comprising a fire fighter services command center. In such a case, this step of detecting 102 such a need will comprise detecting the need to transition the mayor from the police command center virtual setting to the fire fighters command center virtual setting.

There are various ways by which such a need can be detected. By one approach, the user can be supplied with a user interface opportunity that serves to communicate this need. This might comprise, for example, a virtual assertable control in the first virtual setting or, if desired, something as intuitive and simple as a virtual door in the first virtual setting that leads the user (via their avatar, for example) to the second virtual setting. Again, such user interfaces are known in the art and require no further detailed description here.

Upon detecting 102 such a need, this process 100 then provides for maintaining 103 a reduced presence of the user in the first virtual setting. This does not comprise the trivial case of deleting the user's presence in the first virtual setting; instead, this comprises diminishing the presence of the user from a full status to a less-than-completely-deleted status.

By one approach, for example, this can comprise marking an avatar as corresponds to the user in the first virtual setting with an indicator that indicates the reduced presence of the user in the first virtual setting. This might comprise, for example, rendering the avatar in a grayed-out manner, or placing a small sign bearing a message such as "absent" near the avatar. So configured, other users in the first virtual setting will be able to observe or otherwise experience, at least some level, the user's avatar but will also be able to assess and understand the reduced presence of the corresponding user.

As another example in this regard, this can comprise suspending at least some processes as pertain to providing to the user the first interactive virtual reality experience via the first virtual setting. Various processes are reasonable candidates for such treatment. Examples include, but are not limited to, streaming video processes, streaming audio processes, and streaming audio-video processes as are known in the art.

In many cases, this step of maintaining 103 a reduced presence of the user in the first virtual setting can comprise, at least in part, directing information from the application client(s) for the user to the corresponding application server for the first interactive virtual reality experience regarding the user's reduced presence status. By one approach this can comprise a relatively simple and short representation. Such an approach may be appropriate when the application server is pre-configured to effect the desired reduced presence functionality when so instructed by the application server. By another approach this can comprise a series of specific instructions from the application server regarding which actions are specifically to be taken to effect the desired reduction in presence.

This process 100 then also provides for establishing 104 a full presence of the user in the second virtual setting. This step occurs notwithstanding the previous step regarding reducing (which does not include deleting) the presence of the user in the first virtual space. Establishing 104 this full presence can comprise, for example, facilitating at least some processes (such as the aforementioned streaming processes) as pertain to providing the user with the second interactive virtual reality experience via the second virtual setting. These steps of establishing such a full presence, of course, can then lead to optionally providing 105 to this user the second interactive virtual reality experience via the second virtual setting.

If desired, this process 100 can be readily expanded to include, for example, later detecting 106 a need to transition the user from the second interactive virtual reality experience back to the first interactive virtual reality experience. Upon detecting such a need, this process 100 can then facilitate maintaining 107 a reduced presence of the user in the second virtual setting while then also establishing 108 a full presence of the user back in the first virtual setting as part of then providing 109 to that user the first interactive virtual reality experience via the first virtual setting. Again establishing a full presence in the first virtual setting can comprise, for example, again facilitating the relevant attendant processes such as, but not limited to, the aforementioned streaming processes. This can also comprise removing the indicator that marks the user's avatar as having a reduced presence.

Figure 2:
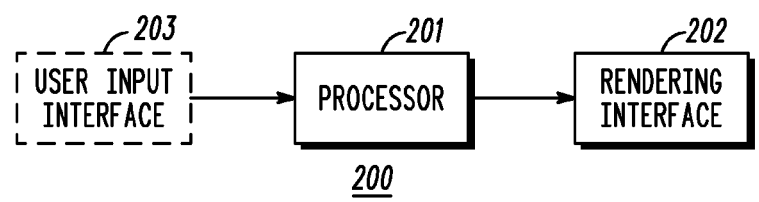
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

Such an apparatus 200 can be generally comprised of a processor 201 (which may comprise one or more processing platforms as will be well understood by those skilled in the art) that operably couples to a rendering interface 202 (which may comprise, for example, one or more displays, audio transducers, haptic transducers, and so forth). This rendering interface serves, at least in part, to provide rendered content (visual, audible, or the like) to the user. In addition, in an optional configuration, the processor 201 will operably couple to a user input interface 203 to permit and facilitate the receipt of user instructions, reactions, and so forth (which may comprise, for example, a keyboard, a cursor movement device, and so forth).

So configured, the processor 201 can be readily configured and arranged (via, for example, corresponding programming), to effect selected teachings as are set forth herein. This can comprise, for example, using the rendering interface to provide to the user the first interactive virtual reality experience via the first virtual setting, detecting the need to transition the user to the second interactive virtual reality experience via the second virtual setting, maintaining the reduced presence of the user in the first virtual setting when effecting such a transition, and establishing a full presence of the user in the second virtual setting as described above (in addition to such other described actions as may be further implemented).

Figure 3:
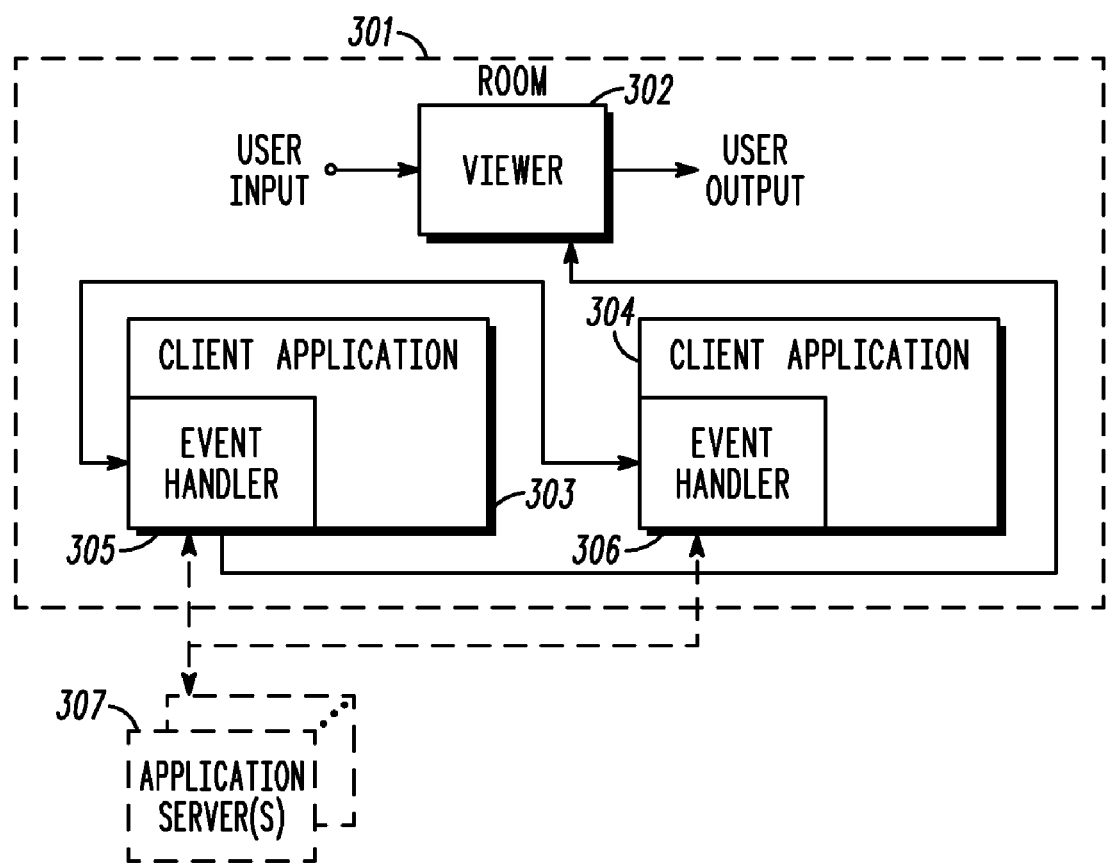
FIG. 3 comprises a block diagram as configured in accordance with various embodiments of the invention.

As noted above, in many application settings these teachings may be implemented using one or more application servers and corresponding client applications. In such a case, the aforementioned apparatus 200 can serve, at least in part, to support such client applications as desired. To illustrate further, and referring now to FIG. 3, a given virtual setting can comprise a corresponding room 301 paradigm. Such a room 301 paradigm can be facilitated using a viewer module 302 that receives user inputs (via user input modalities of choice) and that outputs rendered content as user output for consumption by the user.

Such a viewer 302 can operably interact with one or more client applications (represented here by two such client applications 303 and 304) that serve, at least in part, to service, form, and otherwise give substance to the virtual reality experience being rendered via the room paradigm 301. These client applications can each include an event handler module 305 and 306 that receives input as appropriate from the user and the application server (or servers) 307 that provides external information regarding the experiential contributions and interactions as offered by, for example, the dictates of the server-based experience, other participants, and so forth. So configured, the client applications can form the appropriate version(s) of the virtual reality experience to be rendered for the user. This can comprise, as but one example in this regard, a view of the room 301 from the perspective of the user's avatar (where each participant has their own perspective of the room as based upon their particular location within that virtual setting).

Those skilled in the art will recognize that a virtual setting manager as described herein can be configured and arranged to suit the particular needs and/or opportunities as tend to characterize a wide variety of application settings. Consider, for example, the following illustrative scenario.

Illustrative Scenario

In this example, a user selects a virtual setting comprising a first room. The virtual setting manager checks an OLD ROOM flag to determine its state. When this flag is set, thereby indicating that the user is already in an existing virtual setting room, the virtual setting manager can act in accordance with these teachings to reduce the user's presence in that room.

Having concluded the latter step (or when no existing virtual setting already exists), the virtual setting manager can then determine whether the requested first room already exists. If not, the virtual setting manager can create a new corresponding viewer and scene-graph branch in accordance with prior art practice in this regard and also establish one or more connections to the corresponding application server or servers as needed.

At this point, if desired, the virtual setting manager can check to confirm the validity of the newly created room. Lacking apparent validity, the virtual setting manager could then check to again determine the state of the OLD ROOM flag. If the latter still confirms the lack of an existing room, at this point, the virtual setting manager can signal an error condition to the user, system administrator, and/or other interested party. If the OLD ROOM flag is not null, the virtual setting manager can set the new room to be the "old room." Following this action, or when the above-described determination regarding validity of the new room proves true, the virtual setting manager can then resume the processes of the new room.

At this point, the virtual setting manager can now enable the corresponding viewer and the ability of the user to provide input to the new room. The virtual setting manager can also switch applicable global applications to the new viewer. At this point the virtual setting manager is now rendering the new room for the user and the process can continue in conformance with desired practice going forward.

Those skilled in the art will recognize that the foregoing example is intended to serve only in an illustrative capacity and is not intended to comprise an exhaustive presentation in this regard or to otherwise serve as a limitation by example. The skilled artisan will also now readily understand and appreciate that these teachings are readily applied and leveraged in a variety of application settings and can further be readily scaled to accommodate a large number of virtual settings and the like. It will further be appreciated that these teachings are readily implementable in a relatively cost effective manner.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, the aforementioned marking of a user's avatar to indicate a reduced presence of the user in the corresponding virtual setting can occur in a relatively passive manner or can be accompanied by a more active feature such as an audible announcement to actively alert other participants in the virtual setting regarding this alteration of presence status.

We claim:

1. In an interactive virtual-reality environment where participants are represented as avatars, a method comprising:
    providing to a user via a rendering interface a first interactive virtual reality experience via a first virtual setting in the interactive virtual-reality environment, wherein the user is represented by an avatar in the first interactive virtual reality experience;
    upon detecting by a processor, a need to transition the user to a second interactive virtual reality experience via a second virtual setting, wherein at least the second virtual setting is different from the first virtual setting:
        maintaining a reduced presence of the user in the first virtual setting by modifying the avatar to indicate that the user has the reduced presence;
        establishing a full presence of the user in the second virtual setting by creating a second avatar within the second virtual setting that indicates that the user has the full presence in the second virtual setting.

2. The method of claim 1 wherein the first virtual setting comprises a first virtual room and the second virtual setting comprises a second virtual room.

3. The method of claim 1 wherein the first interactive virtual reality experience comprises an experience that provides substantially real-time interaction with at least one other user.

4. The method of claim 3 wherein the second interactive virtual reality experience comprises an experience that provides substantially real-time interaction with at least one other user.

5. The method of claim 1 wherein the first and second interactive virtual reality experiences each provides a public safety services purpose.

6. The method of claim 1 further comprising:
    providing to the user the second interactive virtual reality experience via the second virtual setting.

7. The method of claim 1 wherein maintaining a reduced presence of the user in the first virtual setting further comprises, at least in part, suspending at least some processes as pertain to providing to the user the first interactive virtual reality experience via the first virtual setting.

8. The method of claim 7 wherein at least one of the processes comprises at least one of:
a streaming video process;
a streaming audio process;
a streaming audio-video process.

9. The method of claim 1 wherein establishing a full presence of the user in the second virtual setting comprises, at least in part, facilitating at least some processes as pertain to providing to the user the second interactive virtual reality experience via the second virtual setting.

10. The method of claim 9 wherein at least one of the processes comprises at least one of:
a streaming video process;
a streaming audio process;
a streaming audio-video process.

11. The method of claim 1 further comprising:
upon detecting a need to transition the user to the first interactive virtual reality experience via the first virtual setting from the second virtual setting:
maintaining a reduced presence of the user in the second virtual setting;
establishing a full presence of the user in the first virtual setting.

12. The method of claim 1 wherein the step of modifying the avatar comprises the step of rendering the avatar in a grayed-out manner.

13. The method of claim 1 wherein the step of modifying the avatar comprises the step of placing a small sign bearing a message near the avatar.

14. An apparatus comprising:
a rendering interface configured and arranged to provide rendered content to a user in an interactive virtual-reality environment where participants are represented as avatars;
a processor operably coupled to the rendering interface and being configured and arranged to:
use the rendering interface to provide to the user a first interactive virtual reality experience via a first virtual setting, wherein the user is represented by an avatar in the first virtual setting;
upon detecting a need to transition the user to a second interactive virtual reality experience via a second virtual setting, wherein at least the second virtual setting is different from the first virtual setting:
maintain a reduced presence of the user in the first virtual setting by modifying the avatar to indicate that the user has the reduced presence; and
establish a full presence of the user in the second virtual setting by creating a second avatar within the second virtual setting that indicates that the user has the full presence in the second virtual setting.

15. The apparatus of claim 14 wherein the processor is further configured and arranged to use the rendering interface to provide to the user a first interactive virtual reality experience via a first virtual setting by receiving at least some virtual reality experience content from a server.

16. The apparatus of claim 15 wherein the processor is further configured and arranged to maintain a reduced presence of the user in the first virtual setting by providing the server with information regarding the reduced presence such that the server can utilize the information to present the reduced presence to other users of the first virtual setting.

17. The apparatus of claim 16 wherein the processor is further configured and arranged to establish a full presence of the user in the second virtual setting by providing information regarding the full presence of the user to a server that provides at least some virtual reality experience content as pertains to the second interactive virtual reality experience.

18. The apparatus of claim 14 wherein the processor is further configured and arranged, upon detecting a need to transition the user to the first interactive virtual reality experience via the first virtual setting from the second virtual setting, to:
maintain a reduced presence of the user in the second virtual setting;
establish a full presence of the user in the first virtual setting.

* * * * *